(12) United States Patent
McComb

(10) Patent No.: US 10,323,521 B2
(45) Date of Patent: Jun. 18, 2019

(54) HYBRID FAN BLADE BISCUIT CONSTRUCTION

(71) Applicant: UNITED TECHNOLOGIES CORPORATION, Farmington, CT (US)

(72) Inventor: Patrick James McComb, Naugatuck, CT (US)

(73) Assignee: UNITED TECHNOLOGIES CORPORATION, Farmington, CT (US)

(*) Notice: Subject to any disclaimer, the term of this patent is extended or adjusted under 35 U.S.C. 154(b) by 56 days.

(21) Appl. No.: 14/761,685

(22) PCT Filed: Dec. 16, 2013

(86) PCT No.: PCT/US2013/075356
§ 371 (c)(1),
(2) Date: Jul. 17, 2015

(87) PCT Pub. No.: WO2014/143265
PCT Pub. Date: Sep. 18, 2014

(65) Prior Publication Data
US 2015/0354375 A1    Dec. 10, 2015

Related U.S. Application Data

(60) Provisional application No. 61/885,574, filed on Oct. 2, 2013, provisional application No. 61/791,108, filed on Mar. 15, 2013.

(51) Int. Cl.
*F01D 5/14* (2006.01)
*B23K 31/02* (2006.01)
(Continued)

(52) U.S. Cl.
CPC .............. *F01D 5/147* (2013.01); *B23K 31/02* (2013.01); *B23K 2101/001* (2018.08);
(Continued)

(58) Field of Classification Search
CPC .......... F01D 9/02; F01D 60/805; F01D 5/282; F01D 5/147; F01D 5/28; F01D 5/14;
(Continued)

(56) References Cited

U.S. PATENT DOCUMENTS 4,095,322 A * 6/1978 Scarpati ................ B29C 70/345
156/182
5,472,314 A    12/1995 Delonge et al.
(Continued)

FOREIGN PATENT DOCUMENTS

JP    S59215905 A    12/1984
JP    05-023920 A    2/1993
(Continued)

OTHER PUBLICATIONS

International Search Report for related PCT Application No. PCT/US2013/075356; dated Apr. 15, 2014.
(Continued)

*Primary Examiner* — Andrew H Nguyen
(74) *Attorney, Agent, or Firm* — Cantor Colburn LLP

(57) ABSTRACT

An airfoil for a gas turbine engine is disclosed. The airfoil may include a first portion including a first slot, a second portion including a second slot, and a biscuit disposed within the first slot and the second slot. The first portion and the second portion may be joined by the biscuit. A method for constructing an airfoil is also disclosed. The method may include making a first slot on a sheath, the first slot sized to fit a first part of a biscuit; making a second slot on a body, the second slot sized to fit a second part of the biscuit; and joining the sheath and the body together through a biscuit
(Continued)

joint, the biscuit disposed within the first slot and the second slot.

17 Claims, 6 Drawing Sheets

(51) Int. Cl.
    *F04D 29/32*     (2006.01)
    *B23K 101/00*     (2006.01)

(52) U.S. Cl.
    CPC ........ *F04D 29/324* (2013.01); *F05D 2220/36* (2013.01); *F05D 2240/303* (2013.01); *F05D 2300/48* (2013.01); *Y02T 50/672* (2013.01); *Y02T 50/673* (2013.01); *Y10T 29/49341* (2015.01)

(58) Field of Classification Search
    CPC ............... B29C 70/345; F05D 2230/23; F05D 2230/48; F05D 2240/303; F05D 2230/60; Y02T 50/672; Y02T 416/224; Y02T 416/23; Y02T 415/20; Y02T 50/00; B23K 1/00; B23P 15/02; B23P 15/04; Y10T 29/49936; Y10T 29/49938; B29D 99/0025
See application file for complete search history.

(56) References Cited

U.S. PATENT DOCUMENTS

| | | | |
|---|---|---|---|
| 5,725,354 A | | 3/1998 | Wadia et al. |
| 5,755,558 A | * | 5/1998 | Reinfelder ............ B29C 70/446 29/889.7 |
| 7,393,183 B2 | * | 7/2008 | Keller .................... F01D 5/147 416/223 A |
| 7,841,834 B1 | * | 11/2010 | Ryznic ................... B23P 6/005 416/224 |
| 2008/0226459 A1 | | 9/2008 | Enenkl et al. |
| 2009/0022599 A1 | * | 1/2009 | Burdgick ................ F01D 5/147 416/230 |
| 2009/0252612 A1 | * | 10/2009 | Ahmad ................... B23P 15/04 416/241 A |
| 2010/0054945 A1 | * | 3/2010 | McMillan ............... F01D 5/282 416/223 A |
| 2010/0074759 A1 | * | 3/2010 | Dierksmeier ........... F01D 5/147 416/241 B |
| 2011/0211967 A1 | * | 9/2011 | Deal ....................... F01D 5/147 416/224 |
| 2013/0004322 A1 | | 1/2013 | Schwarz et al. |
| 2013/0017093 A1 | | 1/2013 | Coupe et al. |

FOREIGN PATENT DOCUMENTS

| | | |
|---|---|---|
| WO | 9308017 A1 | 4/1993 |
| WO | 9606776 A1 | 3/1996 |
| WO | 2012001279 A1 | 1/2012 |

OTHER PUBLICATIONS

English Abstract JPS59215905.
English Machine Translation for Specification and Claims for JPS59215905.
Supplementary European Search Report for Application No. EP 13 87 8293.
EP Office Action for Application No. 13 878 293.3; dated Jan. 28, 2019.

* cited by examiner

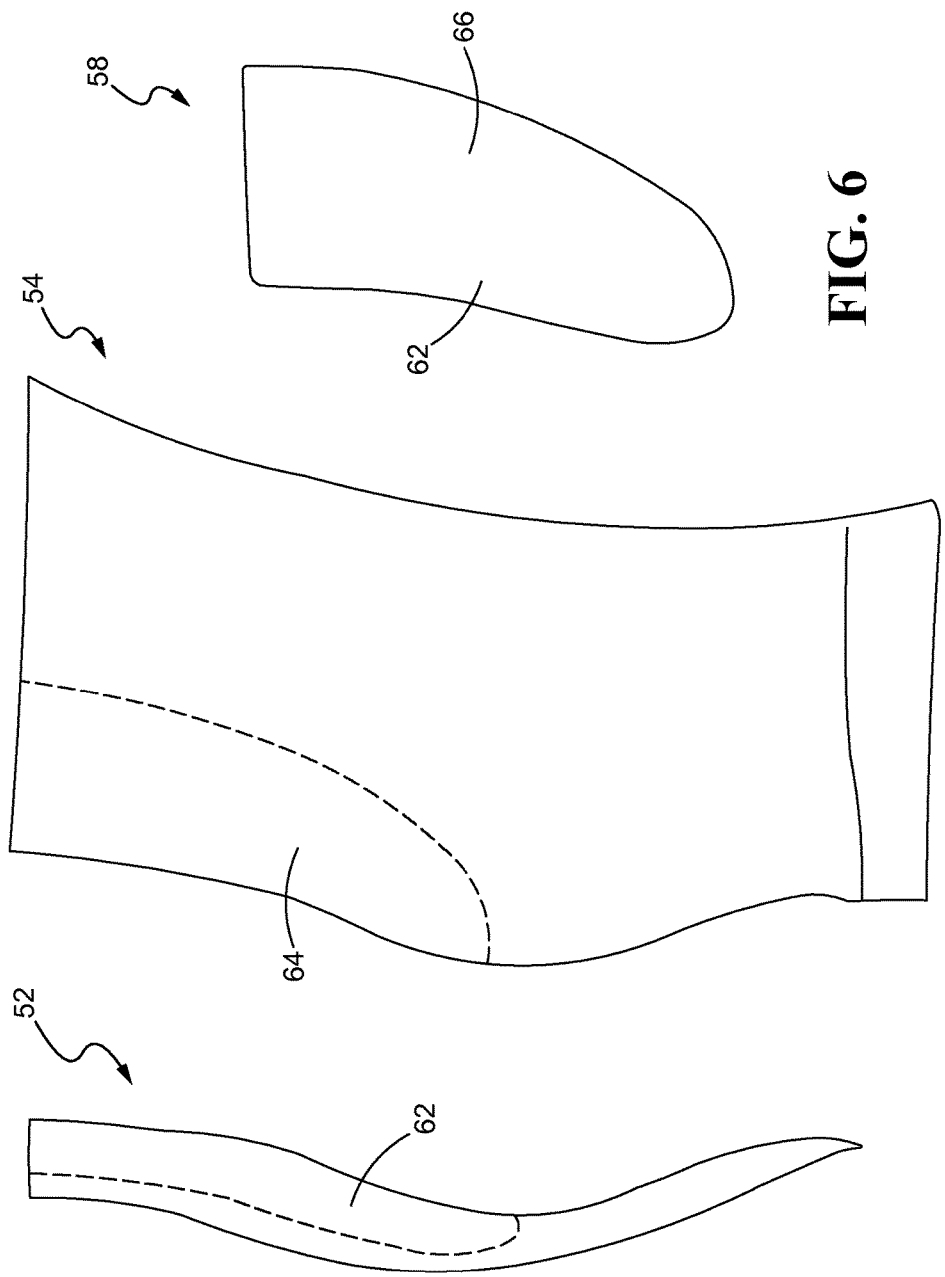

HYBRID FAN BLADE BISCUIT CONSTRUCTION

CROSS-REFERENCE TO RELATED APPLICATION

This Application is a US National Stage under 35 USC § 371 of International Patent Application No. PCT/US13/75356 filed on Dec. 16, 2013, and claims priority under 35 USC § 119(e) to U.S. Provisional Patent Application Ser. No. 61/791,108 filed on Mar. 15, 2013 and 61/855,574 filed on Oct. 2, 2013.

FIELD OF THE DISCLOSURE

The present disclosure relates generally to gas turbine engines and, more particularly, to fan blades in a gas turbine engine.

BACKGROUND OF THE DISCLOSURE

Gas turbine engines may typically include a fan, a compressor, a combustor, and a turbine, with an annular flow path extending axially through each. Initially, the fan, which is powered by the turbine, draws ambient air into the engine. Part of the air flows through the compressor where it is compressed or pressurized. The combustor then mixes and ignites the compressed air with fuel, generating hot combustion gases. These hot combustion gases are then directed from the combustor to the turbine where power is extracted from the hot gases by causing blades of the turbine to rotate. The other part of the airflow from the fan is used to generate forward thrust.

Various components of the gas turbine engine, such as fan, compressor, and turbine airfoils, are subject to the impact of foreign objects. For example, fan blades may experience foreign object damage (FOD) from debris or birds, which may reduce the life of the fan blades. Accordingly, there exists a need for an airfoil design with reinforced strength and impact tolerance.

Furthermore, when increasing the strength of airfoils, there are added concerns of increased weight and thickness, which may decrease the aerodynamic performance of the airfoils and gas turbine engine as a whole. Therefore, there exists a need for an impact resistant airfoil that is also lightweight and aerodynamic. This disclosure is directed to solving these needs and others.

SUMMARY OF THE DISCLOSURE

According to one embodiment, an airfoil for a gas turbine engine is disclosed. The airfoil may comprise a first portion including a first slot, a second portion including a second slot, and a biscuit disposed within the first slot and the second slot. The first portion and the second portion may be joined by the biscuit.

In a refinement, the first portion may be a sheath and the second portion may be a body.

In a related refinement, the body may be hollow.

In another refinement, the biscuit may be positioned near a leading edge.

In a refinement, the biscuit may be positioned in an outer span.

In another refinement, the biscuit may be composed of organic composite material.

In a refinement, the biscuit may be composed of energy absorbent material.

In another refinement, the biscuit may be composed of Kevlar.

In yet another refinement, at least one of the first portion and the second portion may be bonded to the biscuit.

According to another embodiment, a gas turbine engine is disclosed. The gas turbine engine may comprise a fan section, a compressor section downstream of the fan section, a combustor section downstream of the compressor section, and a turbine section downstream of the combustor section. At least one of the fan section, compressor section, and the turbine section having an airfoil may include a sheath including a first slot sized to fit a first part of a biscuit, a body including a second slot sized to fit a second part of the biscuit, and a biscuit joint between the sheath and the body. The biscuit joint may include a biscuit disposed within and bonded to the first and second slots. The sheath and the body may be joined together by the biscuit.

In a refinement, the biscuit may be positioned near a leading edge of the airfoil.

In a related refinement, the biscuit may be positioned in an outer span of the airfoil.

In another refinement, the biscuit may be composed of ballistic material.

In a refinement, a material of the biscuit may be of lighter weight than a material of the sheath, and the material of the biscuit may be of lighter weight than a material of the body.

In another refinement, the biscuit may increase stiffness, impact resistance, and aerodynamic performance of the airfoil.

According to yet another embodiment, a method for constructing an airfoil is disclosed. The method may comprise making a first slot on a sheath, the first slot sized to fit a first part of a biscuit. The method may further comprise making a second slot on a body, the second slot sized to fit a second part of the biscuit. The method may further comprise joining the sheath and the body together through a biscuit joint, the biscuit disposed within the first slot and the second slot.

In a refinement, the method may further comprise bonding the biscuit to the first slot.

In another refinement, the method may further comprise bonding the biscuit to the second slot.

In another refinement, the method may further comprise positioning the first slot, the second slot, and the biscuit near a leading edge and an outer span of the airfoil.

In yet another refinement, the method may further comprise composing the biscuit of organic composite material.

These and other aspects and features of the disclosure will become more readily apparent upon reading the following detailed description when taken in conjunction with the accompanying drawings. Although various features are disclosed in relation to specific exemplary embodiments of the invention, it is understood that the various features may be combined with each other, or used alone, with any of the various exemplary embodiments of the invention without departing from the scope of the invention.

BRIEF DESCRIPTION OF THE DRAWINGS

FIG. 4 is a side view of a sheath of the airfoil of FIG. 2;

FIG. 5 is a side view of a body of the airfoil of FIG. 2;

FIG. 6 is a side view of a biscuit of the airfoil of FIG. 2;

While the present disclosure is susceptible to various modifications and alternative constructions, certain illustrative embodiments thereof will be shown and described below in detail. The invention is not limited to the specific embodiments disclosed, but instead includes all modifications, alternative constructions, and equivalents thereof.

DETAILED DESCRIPTION

Figure 1:
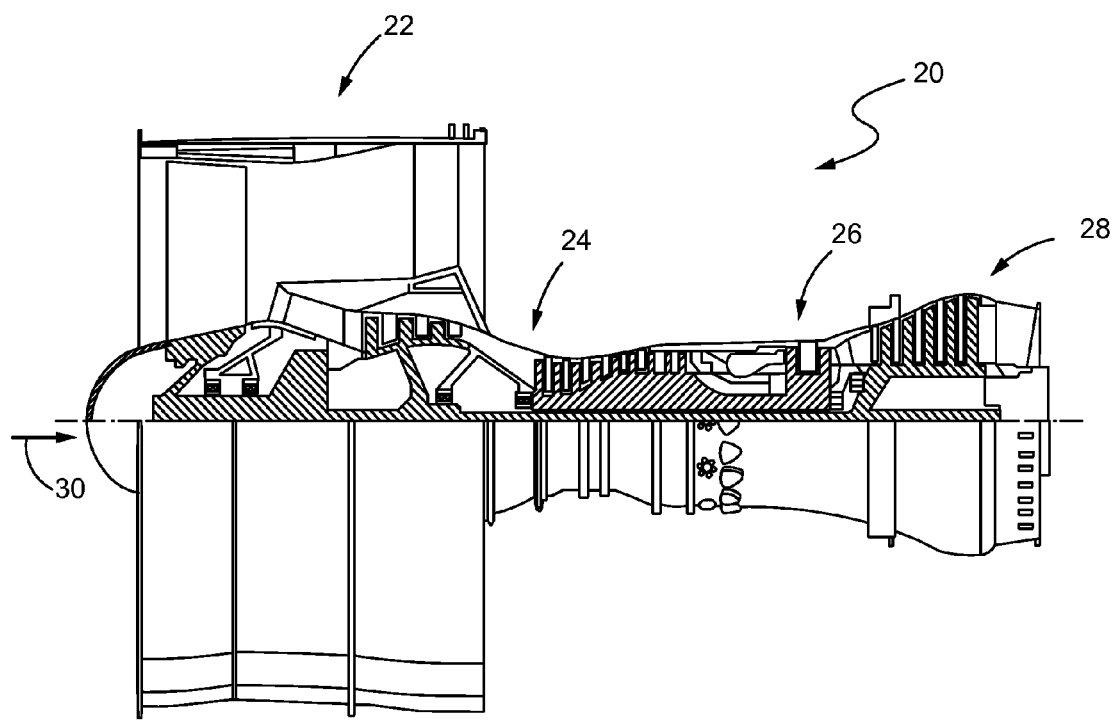
FIG. 1 is a cross-sectional view of a gas turbine engine, according to an embodiment of the present disclosure.
Figure 2:
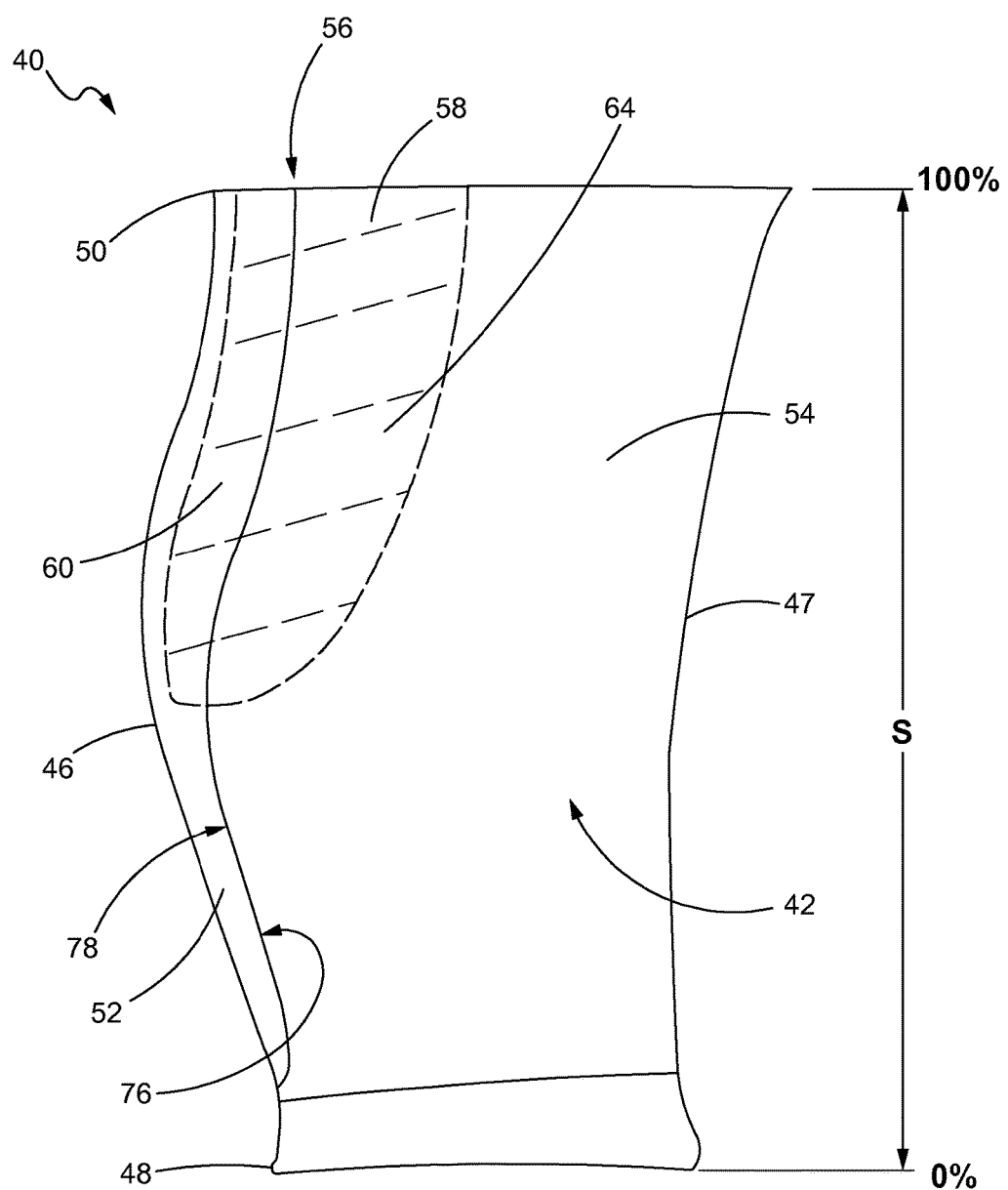
FIG. 2 is a side view of an airfoil in the gas turbine engine of FIG. 1.
Figure 3:
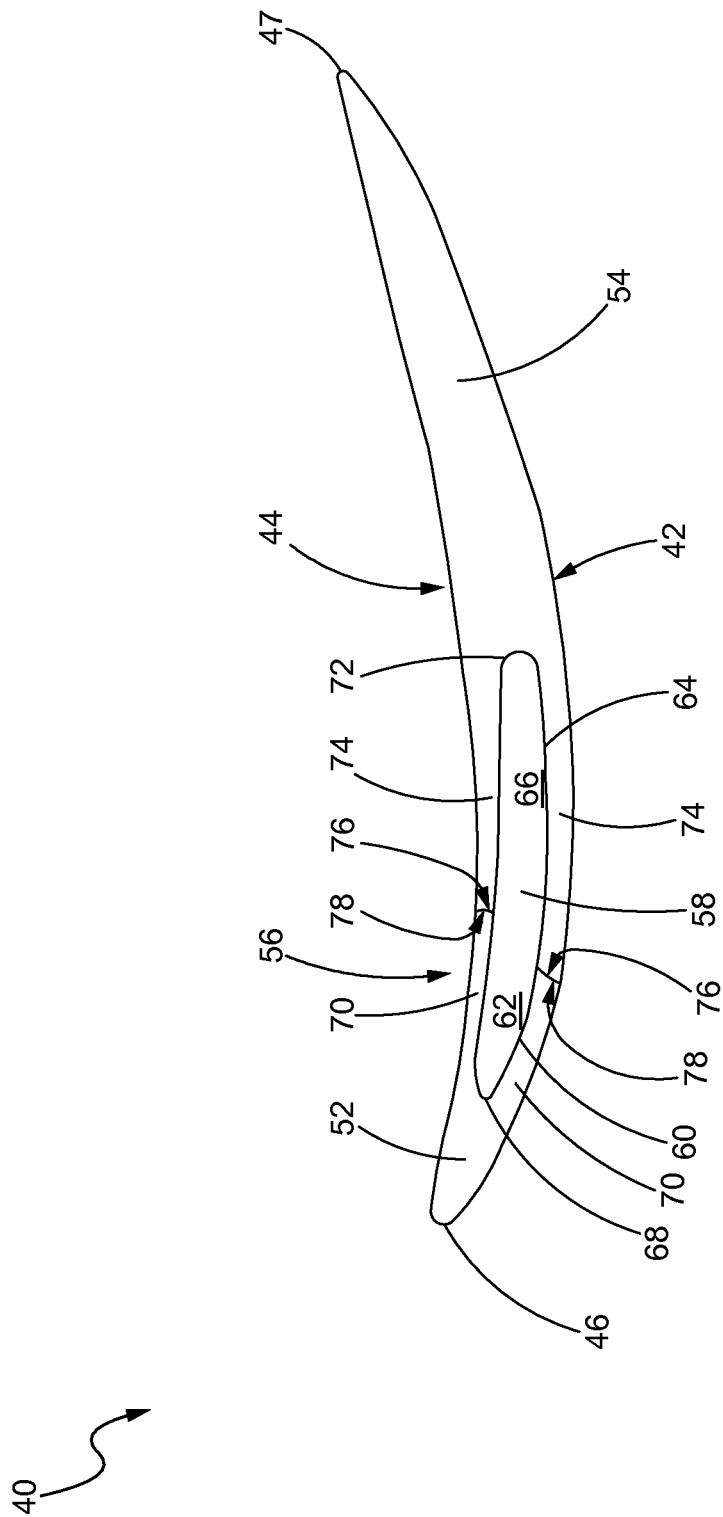
FIG. 3 is a top down view of the airfoil of FIG. 2.

Referring now to the drawings, and with specific reference to FIG. 1, in accordance with the teachings of the disclosure, an exemplary gas turbine engine 20 is shown. The gas turbine engine 20 may generally comprise a fan section 22 which draws ambient air into the engine 20, a compressor section 24 where air is pressurized, a combustor 26 downstream of the compressor section which mixes and ignites the compressed air with fuel and thereby generates hot combustion gases, a turbine section 28 downstream of the combustor 26 for extracting power from the hot combustion gases, and an annular flow path 30 extending axially through each. Gas turbine engine 20 may be used on an aircraft for generating thrust or power, or in land-based operations for generating power as well.

Turning now to FIGS. 2-6, an airfoil 40 of the gas turbine engine 20 is shown, according to an embodiment of the present disclosure. The airfoil 40 may comprise a fan blade in the fan section 22, or a rotor blade or stator vane in the compressor section 24 or turbine section 28 of the gas turbine engine 20. Airfoil 40 may project radially from an end wall of a rotor in the engine 20. The airfoil 40 may include a first side 42 and an opposite second side 44 extending axially from a leading edge 46 to a trailing edge 47 (downstream of the leading edge 46) and extending radially from a base 48 to a tip 50.

Airfoil 40 may be of a hybrid construction including a first portion or sheath 52 and a second portion or body 54. The sheath 52 may generally comprise the leading edge 46 and extend a distance therefrom. Composed of solid titanium, or other suitable materials, the sheath 52 may provide impact tolerance to foreign object damage (FOD). The body 54 may generally comprise a majority of the airfoil 40, extending from the sheath 52 to the trailing edge 47, although other configurations are certainly possible. The body 54 may be composed of an aluminum alloy, or other suitable materials.

The sheath 52 and body 54 may be joined together through a biscuit joint 56. The biscuit joint 56 may include a biscuit 58 composed of a stiff, lightweight material that absorbs energy from an impact and increases a stiffness, impact resistance, and aerodynamic performance of the airfoil 40. The biscuit 58 may be composed of a material that is of lighter weight than a material of the sheath 52 and is of lighter weight than a material of the body 54. For example, the biscuit 58 may be composed of an organic composite material (e.g., carbon fibers) or organic matrix composites, polymer matrix composite material, energy absorbent material, ballistic material, synthetic material (e.g., para-aramid synthetic fiber), Kevlar® (poly-paraphenylene terephthalamide), or the like. By using stiff, lightweight material, the biscuit 58 increases the impact tolerance capabilities of the airfoil 40, while decreasing a weight and thickness of the airfoil 40. Although the biscuit 58 may be composed of lightweight material that absorbs energy from an impact, other materials, such as stiff metals (e.g., steel or nickel alloys) may be used.

The sheath 52 may include a first slot 60 sized to fit a first part 62 of the biscuit 58, and the body 54 may include a second slot 64 sized to fit a second part 66 of the biscuit 58. As shown best in FIG. 3, the first slot 60 of the sheath 52 may include a recess 68 and flank portions 70 to receive the first part 62 of the biscuit 58. Similarly, the second slot 64 may include a recess 72 and flank portions 74 to receive the second part 66 of the biscuit 58.

Disposed within the first and second slots 60, 64, the biscuit 58 provides a common element of attachment for both the sheath 52 and body 54. With the first part 62 of the biscuit 58 disposed within the first slot 60 of the sheath 52 and the second part 66 of the biscuit 58 disposed within the second slot 64 of the body 54, the sheath 52 and body 54 may be compressed together about the biscuit 58. Surface 76 of the sheath 52 and surface 78 of the body 54 abut against each other, forming a press fit relationship with the biscuit 58.

The sheath 52 and body 54 may be bonded to the biscuit 58. For example, an epoxy, polyurethane adhesive, or other structural adhesive may be used to bond the sheath 52 and body 54 to the biscuit 58. The first part 62 of the biscuit 58 may be bonded to the first slot 60 of the sheath 52, and the second part 66 of the biscuit 58 may be bonded to the second slot 64 of the body 54. The first and second slots 60, 64 may provide requisite surface area for bonding to the biscuit 58. Furthermore, an epoxy, polyurethane adhesive, or other structural adhesive may be used to bond the sheath 52 to the body 54 where surfaces 76, 78 of the sheath 52 and body 54 are in contact with each other. It is to be understood that other methods may be used to bond the biscuit 58, sheath 52, and body 54 together in a biscuit joint 56, such as, without limitation, welding or the like. The biscuit 58, sheath 52, and body 54 may also be joined together via fasteners (e.g., rivets, screws, bolts, etc.), mechanical retention (e.g., inserts, rails, etc.), or other methods.

The biscuit 58 (and associated slots 60, 64 in the sheath 52 and body 54) may be positioned near the leading edge 46 and in an outer span of the airfoil 40. As used herein, the term "span" refers to a length S of the airfoil 40 from the base 48 to the tip 50, with relevant distances expressed as a percentage of the length S (0% referenced at the base 48 and 100% referenced at the tip 50). The outer span of the airfoil 40 includes a range of about 50% to about 100% of the length S of the span of the airfoil 40. The position of the biscuit 58 near the leading edge 46 and in the outer span helps stiffen the airfoil 40 and enhance impact tolerance capabilities, while maintaining a minimal thickness of the airfoil 40 in the outer span. The biscuit 58 may also provide internal mechanical damping to the airfoil 40 in order to reduce vibratory stress levels and enhance distortion tolerance capabilities.

It is to be understood that, although not shown, the biscuit 58 may also be positioned near the trailing edge 47 and/or any location between the leading and trailing edges 46, 47, as well as in an inner span (a range of about 0% to about 50% of the length S of the span) of the airfoil 40 and/or any location between the base 48 and tip 50. In addition, other shapes for the biscuit 58 and arrangements for the biscuit joint 56 than that shown and described are certainly possible. For example, more than one biscuit 58 or more than one biscuit joint 56 may be used to join various parts of the airfoil 40 together.

Figure 8:
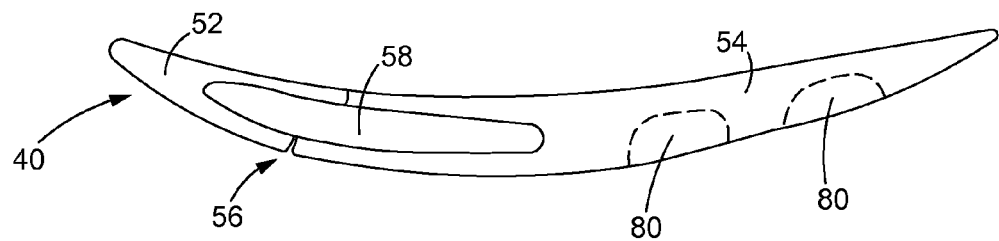
FIG. 8 is a top down view of the airfoil of FIG. 7.
Figure 7:
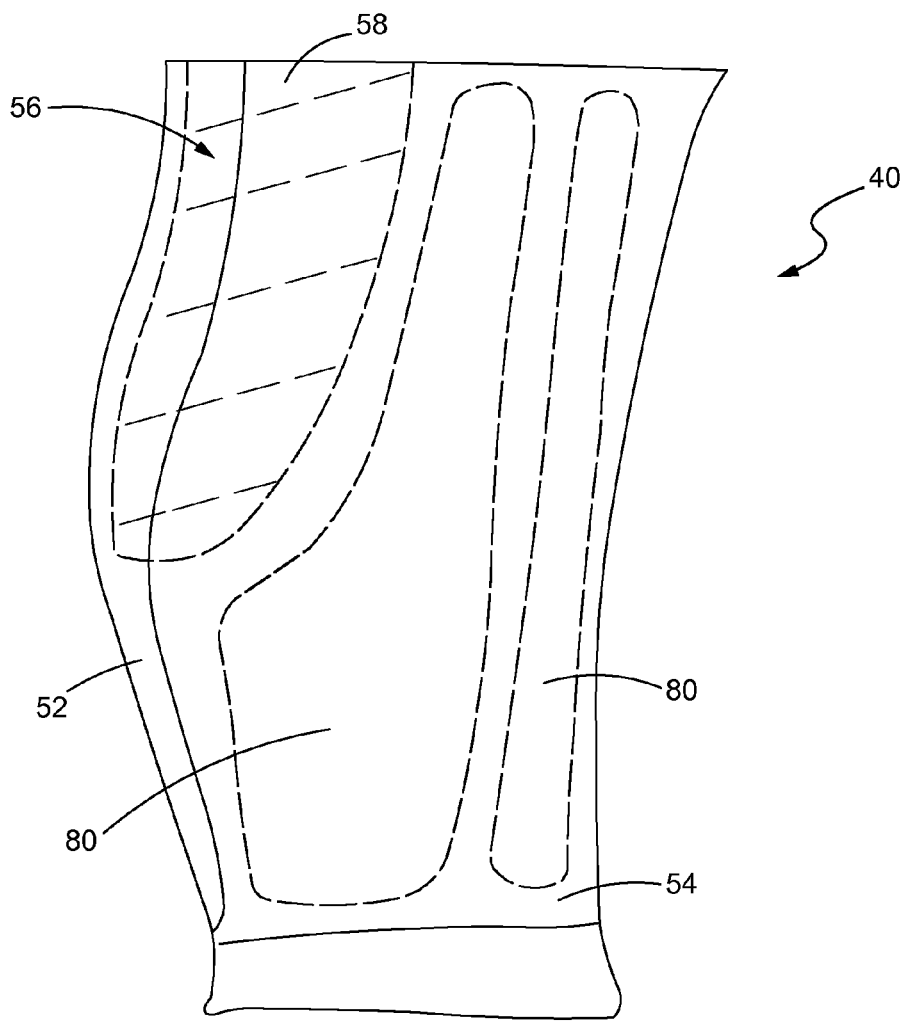
FIG. 7 is a side view of an airfoil, according to another embodiment of the present disclosure.

Although the airfoil 40, shown in FIGS. 2-6, is of a solid construction, in another embodiment shown best in FIGS. 7-8, the airfoil 40 may be of a hollow construction. The airfoil 40 may have one or more cavities 80 in order to decrease a weight of the airfoil 40, thereby increasing the aerodynamic performance of the airfoil 40. It is to be understood that the biscuit joint 56 may be used in other configurations of airfoils than that shown and described herein.

Figure 9:
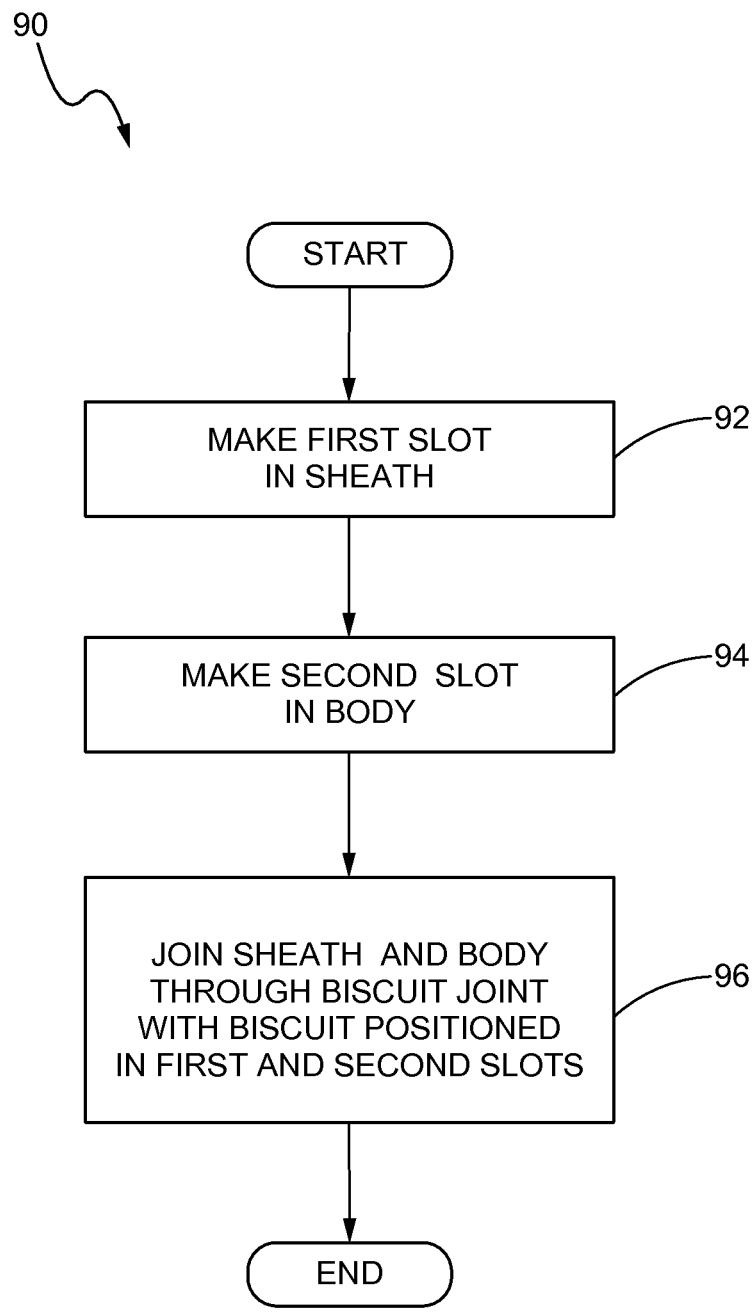
FIG. 9 is a flowchart illustrating an exemplary process for constructing an airfoil for a gas turbine engine, according to another embodiment of the present disclosure.

Referring now to the flowchart of FIG. 9, with continued reference to FIGS. 1-8, an exemplary process 90 for constructing an airfoil 40 for a gas turbine engine 20 is shown. At block 92, the first slot 60 may be made on the sheath 52, the first slot 60 sized to fit the first part 62 of the biscuit 58. At block 94, the second slot 64 may be made on the body 54, the second slot 64 sized to fit the second part 66 of the biscuit 58. For example, the first and second slots 60, 64 may be made in the sheath 52 and body 54, respectively, via machining, standard milling, electrical discharge machining, electrochemical machining, chemical milling, forming material into shape (e.g., bending), or the like. At block 96, the sheath 52 and the body 54 may be joined together through the biscuit joint 56 with the biscuit 58 positioned within the first slot 60 and the second slot 64. For example, the biscuit 58 may be bonded or welded to the first slot 60 of the sheath 52 and the second slot 64 of the body 54. It is to be understood that blocks 92-96 may be performed in a different order than that shown in FIG. 9.

INDUSTRIAL APPLICABILITY

From the foregoing, it can be seen that the teachings of this disclosure can find industrial application in any number of different situations, including but not limited to, gas turbine engines. Such engines may be used, for example, on aircraft for generating thrust, or in land, marine, or aircraft applications for generating power.

The present disclosure provides a hybrid airfoil biscuit construction for a gas turbine engine and a method of manufacturing same. The disclosed biscuit joint for the airfoil serves the dual purpose of joining the sheath to the body and enhancing impact tolerance capabilities of the airfoil. By providing a biscuit as a common point of attachment for the sheath and the body, a strong joint between the sheath and the body may be achieved. In addition, by selecting lightweight, energy absorbent materials for the biscuit, the biscuit joint reinforces the strength and stiffness of the airfoil, while decreasing its weight and thickness.

Placing the biscuit near the leading edge and outer span of the airfoil further improves the impact resistance of the airfoil to FOD. The biscuit may also provide internal mechanical damping to the airfoil in order to reduce vibratory stress levels and enhance distortion tolerance capabilities. Thus, the disclosed hybrid airfoil biscuit construction provides a robust, durable, and aerodynamic airfoil for a gas turbine engine, which thereby increases the life and aerodynamic performance for the gas turbine engine as a whole.

While the foregoing detailed description has been given and provided with respect to certain specific embodiments, it is to be understood that the scope of the disclosure should not be limited to such embodiments, but that the same are provided simply for enablement and best mode purposes. The breadth and spirit of the present disclosure is broader than the embodiments specifically disclosed, and includes all embodiments and equivalents encompassed within the claims appended hereto as well.

What is claimed is:

1. An airfoil for a gas turbine engine, comprising:
a first portion including a first slot;
a second portion including a second slot, wherein the first portion and the second portion are joined together by a biscuit joint comprising a biscuit disposed within the first slot and the second slot, wherein the first portion is a sheath located on a leading edge of the airfoil, the first slot being defined by flank portions of the sheath extending on opposite sides of the airfoil proximate to the leading edge and the second slot is defined by flank portions of the airfoil extending on opposite sides of the airfoil proximate to the leading edge, wherein the first slot and the second slot extend along a span of the airfoil, wherein the biscuit has a first end located proximate to a tip of the airfoil and a second end located proximate to a mid-span of the airfoil, and wherein the biscuit extends further into the second slot than the first slot.

2. The airfoil of claim 1, wherein a body of the airfoil is hollow.

3. The airfoil of claim 1, wherein the biscuit is positioned in an outer span of the airfoil and the outer span includes a range of about 50% to 100% of a length of the span of the airfoil.

4. The airfoil of claim 1, wherein the biscuit is composed of organic composite material.

5. The airfoil of claim 1, wherein the biscuit is composed of energy absorbent material.

6. The airfoil of claim 1, wherein the biscuit is composed of poly-paraphenylene terephthalamide.

7. The airfoil of claim 1, wherein at least one of the sheath and the second portion is bonded to the biscuit.

8. A gas turbine engine, comprising:
a fan section;
a compressor section downstream of the fan section;
a combustor section downstream of the compressor section; and
a turbine section downstream of the combustor section, at least one of the fan section, compressor section, and the turbine section having an airfoil including:
a sheath including a first slot sized to fit a first part of a biscuit, a body of the airfoil including a second slot sized to fit a second part of the biscuit, and
a biscuit joint between the sheath and the body, the biscuit joint including a biscuit disposed within and bonded to the first and second slots, the sheath and the body joined together by the biscuit, wherein the first slot is defined by flank portions of the sheath extending on opposite sides of the airfoil and the second slot is defined by flank portions of the body of the airfoil extending on opposite sides of the airfoil, wherein the sheath is located on a leading edge of the airfoil, and wherein the first slot and the second slot extend along a span of the airfoil, wherein the biscuit has a first end located proximate to a tip of the airfoil and a second end located proximate to a mid-span of the airfoil, and wherein the biscuit extends further into the second slot than the first slot.

9. The gas turbine engine of claim 8, wherein the biscuit is positioned in an outer span of the airfoil and the outer span includes a range of about 50% to 100% of a length of the span of the airfoil.

10. The gas turbine engine of claim 8, wherein the biscuit is composed of ballistic material.

11. The gas turbine engine of claim 8, wherein a material of the biscuit is of lighter weight than a material of the sheath, and wherein the material of the biscuit is of lighter weight than a material of the body.

12. The gas turbine engine of claim 8, wherein the biscuit increases stiffness, impact resistance, and aerodynamic performance of the airfoil.

13. A method for constructing an airfoil, comprising:
making a first slot on a sheath, the first slot sized to fit a first part of a biscuit;
making a second slot on a body of the airfoil, the second slot sized to fit a second part of the biscuit, wherein the first slot is defined by flank portions of the sheath extending on opposite sides of the airfoil and the second slot is defined by flank portions of the body of the airfoil extending on opposite sides of the airfoil; and
joining the sheath and the body together at a leading edge of the airfoil through a biscuit joint, the biscuit disposed within the first slot and the second slot, wherein the first slot and the second slot extend along a span of the airfoil, wherein the biscuit has a first end located proximate to a tip of the airfoil and a second end located proximate to a mid-span of the airfoil, and wherein the biscuit extends further into the second slot than the first slot.

14. The method of claim 13, further comprising bonding the biscuit to the first slot.

15. The method of claim 13, further comprising bonding the biscuit to the second slot.

16. The method of claim 13, further comprising positioning the first slot, the second slot, and the biscuit at an outer span of the airfoil wherein the outer span includes a range of about 50% to 100% of a length of the span of the airfoil.

17. The method of claim 13, further comprising composing the biscuit of organic composite material.

* * * * *